US008993934B2

(12) United States Patent  
Giazzon et al.

(10) Patent No.: US 8,993,934 B2  
(45) Date of Patent: Mar. 31, 2015

(54) CONVECTION AND STEAM OVEN COMPRISING A HUMIDITY DETECTION AND REGULATION SYSTEM

(75) Inventors: Paolo Giazzon, Santa Giustina (IT); Massimo Tesser, Sedico (IT); Paolo Fontana, Santa Giustina (IT); Paolo Candiago, Sedico (IT)

(73) Assignee: Giorik S.p.A., Sedico, Belluno (IT)

( * ) Notice: Subject to any disclaimer, the term of this patent is extended or adjusted under 35 U.S.C. 154(b) by 0 days.

(21) Appl. No.: 13/105,128

(22) Filed: May 11, 2011

(65) Prior Publication Data

US 2011/0278279 A1  Nov. 17, 2011

(30) Foreign Application Priority Data

May 11, 2010  (IT) .............................. PN2010A0026

(51) Int. Cl.  
    *A21B 1/00*    (2006.01)  
    *F24C 15/32*    (2006.01)  
    *A21B 3/04*    (2006.01)

(52) U.S. Cl.  
    CPC ................ *F24C 15/327* (2013.01); *A21B 3/04* (2013.01)  
    USPC ....................................................... 219/400

(58) Field of Classification Search  
    USPC ........................................ 219/391, 400, 401  
    See application file for complete search history.

(56) References Cited

U.S. PATENT DOCUMENTS

| | | | | |
|---|---|---|---|---|
| 3,304,063 | A * | 2/1967 | Ranson | 366/165.2 |
| 4,547,642 | A * | 10/1985 | Smith | 219/685 |
| 6,019,033 | A * | 2/2000 | Wilson et al. | 99/470 |
| 6,078,730 | A * | 6/2000 | Huddart et al. | 392/480 |
| 6,521,871 | B1 | 2/2003 | Shelton | |
| 6,555,791 | B2 * | 4/2003 | Lubrina et al. | 219/400 |
| 7,759,615 | B2 * | 7/2010 | Ando et al. | 219/401 |
| 8,176,844 | B2 * | 5/2012 | Lichte et al. | 99/474 |
| 2009/0134141 | A1 * | 5/2009 | Crosta et al. | 219/401 |
| 2011/0127252 | A1 * | 6/2011 | Yu et al. | 219/408 |

FOREIGN PATENT DOCUMENTS

| | | |
|---|---|---|
| DE | 103 35 295 | 3/2005 |
| DE | 20 2007 010358 | 9/2007 |
| FR | 2 583 518 | 12/1986 |
| GB | 2 157 834 | 10/1985 |
| GB | 2 207 514 | 2/1989 |
| JP | 63 214655 | 9/1988 |

* cited by examiner

*Primary Examiner* — Tu B Hoang  
*Assistant Examiner* — Amit K Singh  
(74) *Attorney, Agent, or Firm* — Kristina Castellano; Castelano PLLC

(57) ABSTRACT

A convection and steam oven includes an outer supporting casing, which contains a cooking chamber to contain food, a heating element for heating the atmosphere in said cooking chamber, a steam generator, a steam vent, and a cooking chamber humidity detection and regulation system. The humidity detection and regulation system includes at least first and second temperature probes, said humidity detection and regulation system being adapted to operate the steam generator and the steam vent in response to the temperature values detected by said first and second temperature sensing probes.

1 Claim, 4 Drawing Sheets

CONVECTION AND STEAM OVEN COMPRISING A HUMIDITY DETECTION AND REGULATION SYSTEM This application claims priority under 35 USC 119 from Italian Patent Application No. PN2010A000026 (filed May 11, 2010), the specification of which is incorporated herein by reference.

TECHNICAL FIELD OF INVENTION

The present invention relates to a convection and steam cooking oven, in particular for community kitchens, provided with a system for detecting and adjusting the humidity in the cooking chamber.

BACKGROUND OF THE INVENTION

As is well known, mixed convection and steam cooking is increasingly appreciated for the quality of the results obtained; in fact, it makes it possible to cook food, particularly meat and vegetables, in an organoleptic and dietetically optimal manner.

Convection and steam cooking ovens consist essentially of an external support casing, housing at least one food holding chamber, and are equipped with a control and monitoring unit for their operation.

This type of oven is generally equipped with three units of specific devices that have respectively the purpose of supplying heat for heating the atmosphere (air and steam) in the cooking chamber, circulating the atmosphere, and generating the steam inside the chamber.

In electrically heated ovens, the means to heat the atmosphere in the oven generally consist of electrical heating elements, while in gas-heated ovens these means consist of a gas combustion unit and a unit for exchanging the heat between the burning gas and the atmosphere in the oven.

The means for circulating the atmosphere in the oven normally consist of an electric fan unit and a shroud for circulating the atmosphere in a closed circuit within the cooking chamber.

The steam generating means can be instantaneous steam generators or, alternatively, dry saturated steam generators that can be applied in electric ovens as well as in gas ovens.

In ovens with an instantaneous steam generator, also called direct steam generator, or generators that can at times generate moist stream, or steam containing suspended liquid water droplets, steam production is achieved by nebulizing the water supplied by the water supply and blowing it against the heating elements.

In ovens with a dry saturated steam generator, also called ovens with boiler, steam production is generally achieved by using a suitable closed container (boiler) located externally with respect to the cooking chamber, wherein water is evaporated by electrical or gas means.

In general, the oven cooking of food requires very different methods according to the results and effects desired: an efficient control of the humidity in the cooking chamber makes it possible to achieve qualitatively optimal levels of food cooking, avoiding for example an excessive accumulation of water in the food and in the dishes, which would clearly effect their aesthetic appearance and organoleptic characteristics.

It should be emphasized that the term "humidity in the cooking chamber" is intended to mean relative humidity, measured in percentage terms, that expresses the relationship between the quantity of water vapor contained in the mass of air filling the cooking chamber and the maximum amount of water vapor (saturation) that the same mass of air can contain in the same conditions of temperature and pressure.

There are rather sophisticated measuring instruments known in the art that are capable of instantly and precisely detecting the percentage of humidity present in the oven: however, instruments of this type, in addition to being extremely costly, cannot operate at temperatures higher than 180° C., which characteristics make them absolutely unsuitable for use in an oven.

In addition, once the degree of humidity present in the cooking chamber has been measured, it is necessary to have systems that compare it with the level preset/desired by the user, or reference level, and, if necessary, that correct it by the introduction of vapor or air through appropriate known actuator devices.

SUMMARY OF THE INVENTION

The main objective in the subject matter of the present invention is to resolve the drawbacks of the known art by devising a convection and steam cooking oven equipped with a system of detection and adjustment of the humidity present in the cooking chamber of an oven and a process for implementing this detection and adjustment.

In the scope of the above-stated objective, one purpose of the present invention consists of providing an oven provided with a humidity detection and regulation system that is sufficiently accurate but at the same time has a price compatible for being used inside an oven.

Another purpose of the present invention is to provide a detection and regulation system that can also operate at temperatures greater than 180° C. and thus can be suitable to be used in an oven.

A further purpose of the invention is to provide a process for detecting and subsequently adjusting the humidity in the cooking chamber in an automatic mode and that makes it possible to obtain the desired/preset humidity in the cooking chamber.

One no less important purpose is to devise an oven provided with a humidity detection and adjusting system that can be achieved with the usual and known plants, machinery and equipment.

The objective and the purposes indicated above, and others that will be better clarified below, are achieved through the provision of an oven as described below.

BRIEF DESCRIPTION OF THE DRAWINGS

Advantages and characteristics of the invention will become evident from the following description, given by way of non-limiting example, with reference to the accompanying drawings, wherein.

DETAILED DESCRIPTION OF THE EMBODIMENTS OF THE INVENTION

Figure 1:
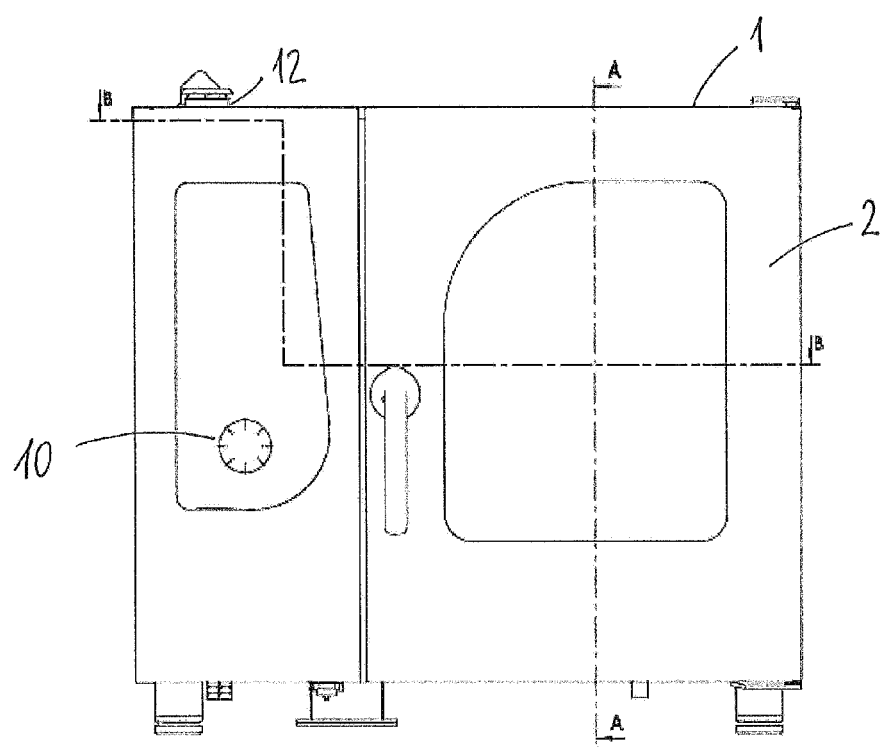
FIG. 1 is a front view of the external support casing of a generic convection and steam oven with control and adjustment of humidity according to the present invention.

With reference to the above-mentioned figures, in particular FIG. 1, an oven is illustrated designed particularly for institutional catering (schools, canteens, hospitals, etc.), and commercial catering (restaurants) based on convection and steam cooking.

A generic convection and steam oven is substantially made up of a box-like support casing 1, preferably metallic, comprising an access door 2 to a food-holding internal cooking chamber 3 and a control and monitoring unit for its operation, controllable through a control interface 10. Behind or laterally on the cooking chamber 3, separated by a partition wall 4 that extends for the full height and almost the full width of the chamber 3 itself, leaving two vertical side slits open for the passage of the oven atmosphere, a further heating chamber 5 is provided, within which chamber is housed at least one fan 30 suitable to circulate the air within the cooking chamber 3 and driven by at least one coaxial electric motor (not shown), arranged externally to the cooking chamber 3.

To allow the discharge of condensation and/or grease forming during the cooking of the food and collecting on the inclined bottom of the cooking chamber 3, as well as any washing liquids, the oven is provided with a discharge conduit 11.

The means for heating the oven atmosphere can be either electric heating elements arranged concentrically around the fan 30 or vertically on the side of the fan and housed together with the fan within the heating chamber 5, or, alternatively, a gas combustion unit and a unit for exchanging the heat between the burning gas and the atmosphere in the oven.

Usually, a temperature measuring device such as a thermometer, measures the temperature reached inside the cooking chamber 3. A relevant control unit compares this temperature with the temperature previously set by the operator and adjusts appropriately the power of the atmosphere heating means.

Convection and steam ovens are also equipped with steam generating means, such as for example instantaneous steam generators and/or dry saturated steam generators, that may be applied in both electric and gas ovens.

Figure 2:
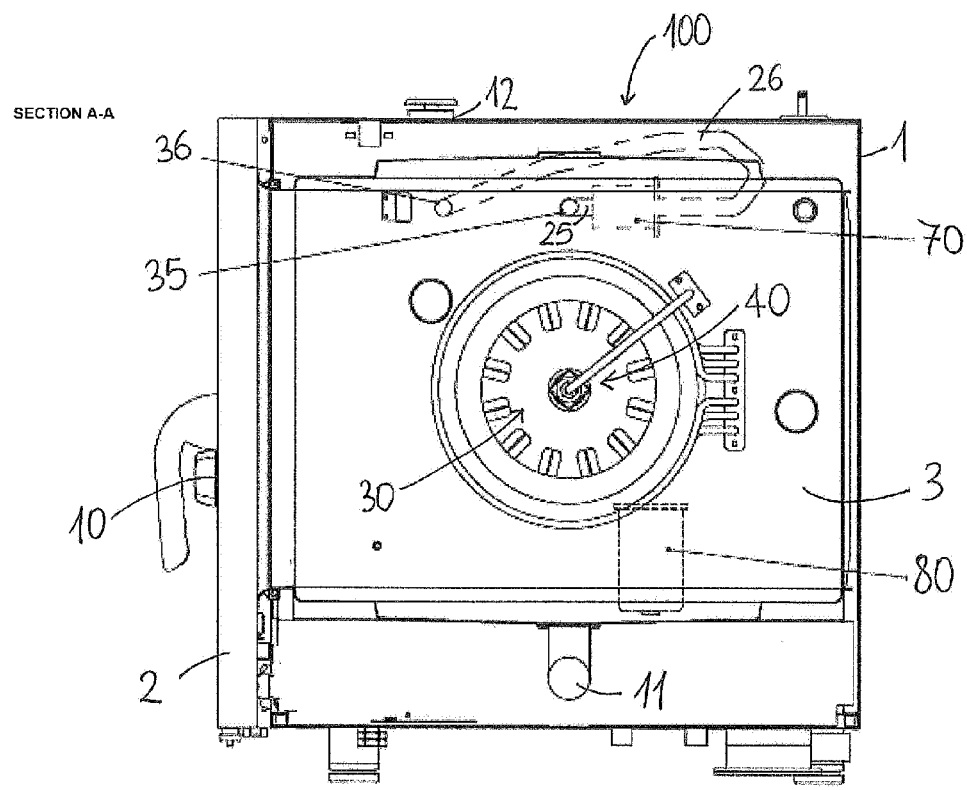
FIG. 2 is a cross-sectional view of the oven shown in FIG. 1 along the cross-sectional line A-A.
Figure 3:
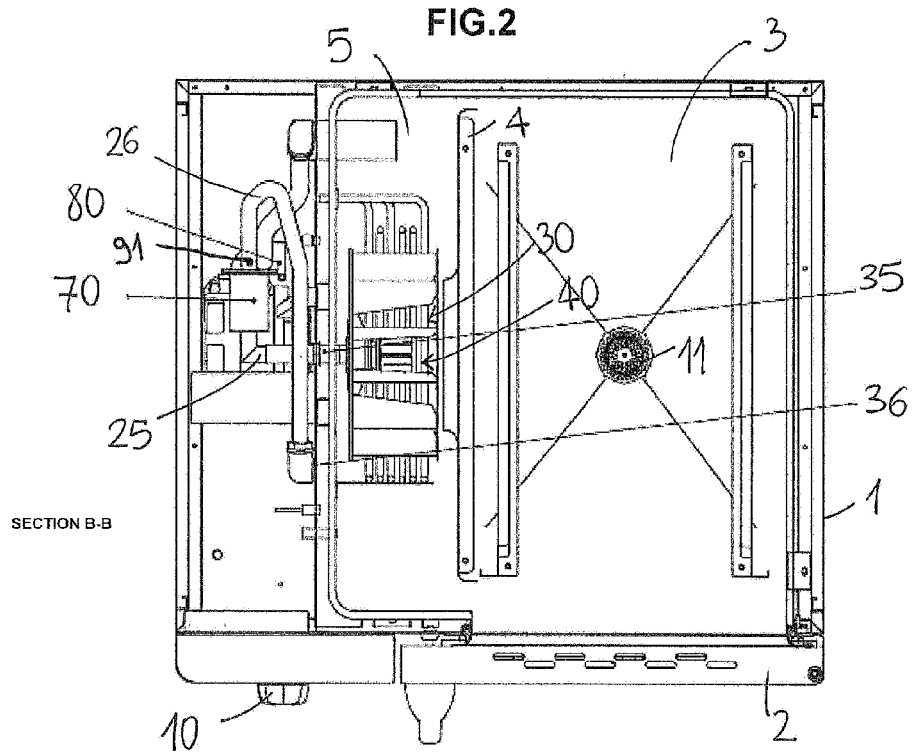
FIG. 3 is a cross-sectional view of the oven shown in FIG. 1 along the cross-sectional line B-B.
Figure 4:
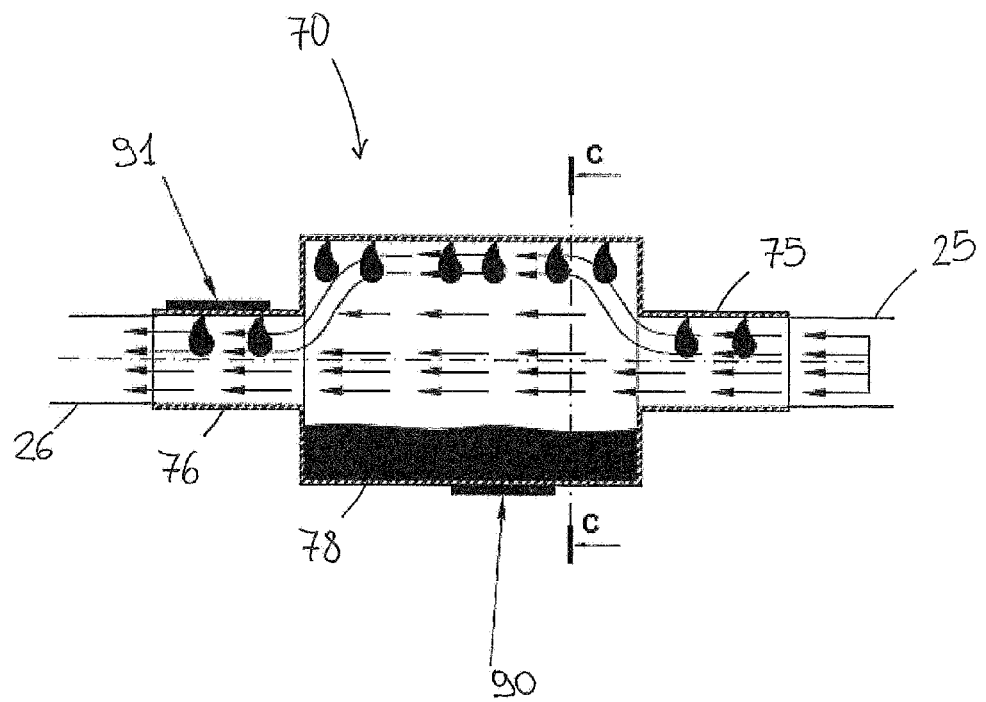
FIG. 4 illustrates a humidity detection element provided in the oven according to the present invention.
Figure 5:
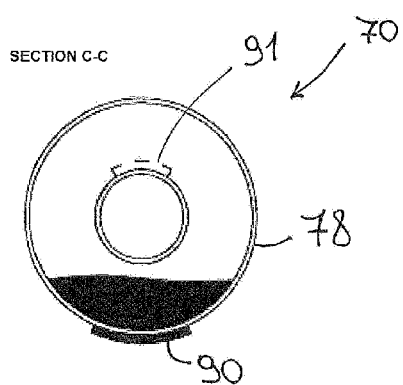
FIG. 5 is a cross-sectional view of the element shown in FIG. 4, seen along the cross-sectional line C-C.

The production of instantaneous steam is achieved by means of an instantaneous steam generator 40 that sprays the water supplied by the water supply against the atmosphere heating means 6, in FIG. 2, of the electric heating elements, on which the evaporation takes place. Externally to the cooking chamber 3 is also provided a closed container 80, or boiler, communicating through a relative conduit with the heating chamber 5, suitable to produce dry saturated steam by heating the water contained in it with some heating elements, such as for example electric heating elements.

Generally, the instantaneous steam generator supplies steam very quickly, but it is usually difficult to determine precisely the amount of humidity delivered by this type of generator; on the contrary, the times necessary to bring the dry saturated steam generator into operation are considerably longer, but the use of this generator makes it possible to strictly adjust the rate of humidity present inside the cooking chamber.

A further discharge conduit, controlled by a relief valve 12, is provided on top of the cooking chamber. The relief valve 12 is operated to introduce cold air into the chamber and then expel any excess steam created in the cooking phase that is thus progressively replaced by the air drawn in from outside.

It should be emphasized that an oven is also obviously equipped with numerous other known devices which, as they are not directly pertinent to the purposes of the present invention, have been omitted.

The convection and steam cooking oven according to the present invention is also provided with a system 100 for detecting and adjusting the degree of humidity present in the atmosphere of the cooking chamber; it includes a first conduit 25 that collects in continuous mode a sample of the atmosphere, a humidity detection element 70, which will be described in detail later, and a second conduit 26 through which the sampled atmosphere is circulated back to the cooking chamber 3. In addition, this system 100 also includes a control unit 99, such as for example a printed circuit board, for handling the collected data and the consequent operation of the devices connected to it to regulate the humidity in the cooking chamber.

This system 100 is preferably located externally to the cooking chamber 3 and the heating chamber 5 so as not to be affected by the high temperatures reached therein.

The humidity detection element 70, located between the two conduits 25 and 26 and connected to them, is formed substantially by a hollow body, preferably made of metallic material, having portions of different cross section: two tubular elements, respectively 75 and 76, referred to as heads, having cross sections substantially identical to each other and also substantially identical to those of the two conduits, respectively 25 and 26, to which they are connected, and a central body 78, for example a cylinder having a cross section that is larger than the cross section of the two heads 75 and 76.

Two temperature sensing probes 90 and 91, such as for example two thermocouples, are arranged on the external surface of the humidity detection element: in particular, the first probe 90 is placed on the lower half of the central body 78, while the second probe 91 is located on the upper half of one of the two heads 75, 76, preferably on the second head 76.

The atmosphere of the cooking chamber is continually recirculated between the cooking chamber 3 and the humidity detection element 70: one part of the atmosphere collected by means of the conduit 25, whose access 35 is preferably positioned just above the center of the fan 30 so as to take advantage of the compression of the same, passes through the humidity detection element 70, in particular for the first head 75, it enters then into the central body 78, flows through the second head 76, and is returned inside the cooking chamber 3 through the conduit 26, whose outflow opening 36 is preferably located laterally with respect to the fan 30.

To explain the operation of the detection system it is necessary to introduce a few basic concepts: in fact, the system relies on known psychrometric principles to draw indirectly measurements of humidity through temperature measurements.

In essence, the humidity present in the cooking chamber is the quantity of water vapor present in the air mass contained in it. This air mass is defined as being saturated when it is no longer capable of absorbing more water vapor, that is, when it has reached the maximum possible quantity absorbed at a given temperature and pressure. Until the saturation value is reached, the water evaporates at a rate inversely proportional to the degree of saturation reached up to that moment. As the water evaporates, it progressively draws heat from the remaining mass of water, causing a lowering of its temperature. This process continues until a stable temperature minimum is reached, which corresponds to the complete saturation of the air.

This basic principle is applied to the humidity detection and adjusting system 100 according to the present invention.

In fact, the moist air that enters into the detection and adjusting system 100 generates water condensation on both the internal surface of the conduits 25, 26 and of the heads 75 and 76, and also, in a greater quantity, it collects on the lower part of the central body 78 due to the widening of the cross section.

The first probe 90 measures the temperature T1 of the lower external surface of the central body 78 that is in contact, with its internal surface, with a given thickness of water. In relation to what was previously explained, the temperature measured by the probe 90 is correlated with the humidity of the air that passes over the free surface of the water condensed inside the central body 78. The temperature T1 measured by the probe 90 provides a substantially precise measurement of the humidity present in the cooking chamber 3. However, due to the heat inertia of water, the probe 90 has reaction times that are rather long and therefore it does not lend itself to detecting rapid changes of humidity that take place inside the cooking chamber of an oven.

The second temperature sensing probe 91, located on the upper external surface of one of the two heads 75 and 76 measures the temperature T2 of the upper external surface of one of the two heads, in particular the second head 76, which, internally, is in contact with the thin layer of water that condenses on it. In this case, the measurement is much faster, and makes it possible to also detect rapid changes of humidity.

The temperature T2 was then experimentally correlated by means of laboratory tests with the humidity present in the air in the cooking chamber 3, using the direct humidity measuring instrument up to the maximum operating temperature of the latter (about 180° C.) and estimating then the subsequent trend with a proportional integral system. Using said second probe 91, it is possible to obtain an indirect estimated measurement $U_{ESTIMATED}$ of the humidity in the cooking chamber 3 of the oven up to temperatures as high as about 300° C.

Clearly, the estimates obtained with experimental methods are susceptible to inaccuracies because they are influenced by infinite connected variables.

In particular, it has been observed that with a low humidity present in the cooking chamber 3, the temperature T2 sensed by the probe 91 can be conditioned by the temperature of the technical space of the oven: the invention also corrects these imprecisions.

The detection system operates substantially as follows: the temperatures T1, T2 sensed respectively by means of the two probes 90, 91 are sampled in a plurality of temporal instants, in a control unit 99, such as a printed circuit board integrated in the oven. Subsequently, said temperatures T1 and T2 are processed with experimental physical models and curves previously calibrated so as to obtain, instant by instant, a $U_{ESTIMATED}$ humidity value.

For the reasons explained above, the system has been preset in such a manner that, under operating conditions, it supplies an estimate of the humidity value in response to the temperature measurement T2 obtained with the second temperature sensing probe 91; in this phase, on the other hand, the measurement obtained with the first temperature probe 90, this probe being slower, serves only as control.

The moment in which there is a disagreement between the trends of the temperatures T1, T2 sensed by the two probes 90, 91, the system automatically recognizes as most reliable the measurement made by the first temperature probe 90 and thus relies on it to obtain the humidity measurement. When the condition of agreement between the two measurements is re-established, the system immediately goes back to relying on the second temperature sensing probe 91.

Figure 6:
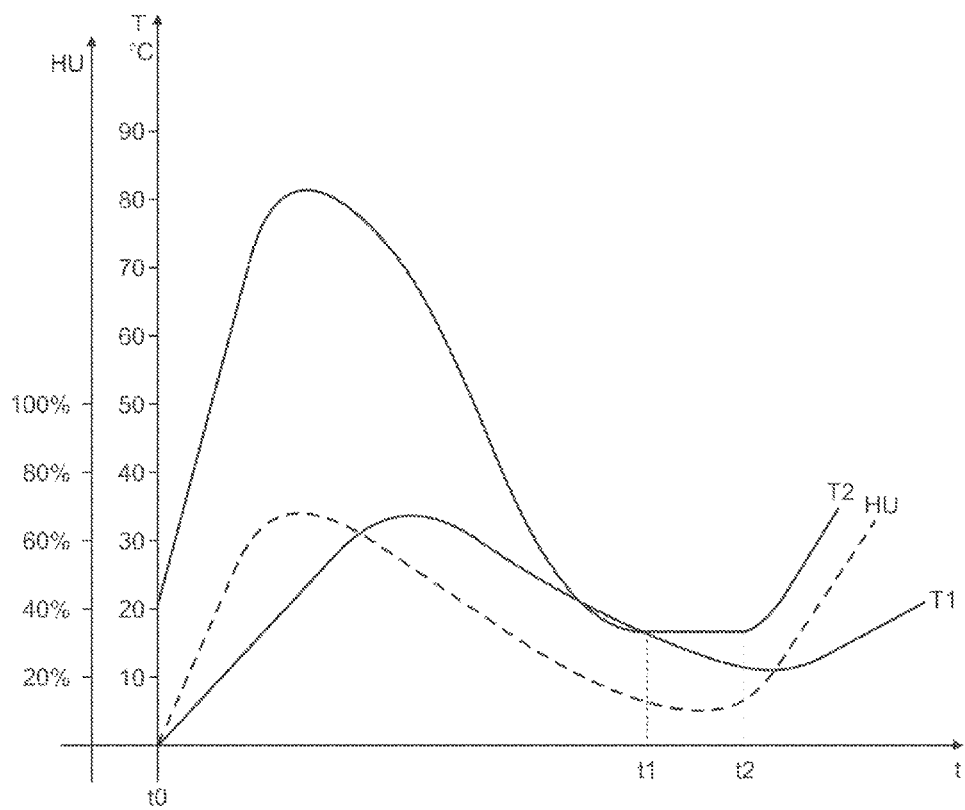
FIG. 6 schematically illustrates the operation of the system for detecting and adjusting the humidity present in a convection and steam cooking oven according to the present invention.

The operation of the detection and control system 100 is schematically illustrated in FIG. 6. In the graph, it can be seen that in the interval of time between t0 and t1, the trend of the temperatures T2 detected by the second probe 91 follows with sufficient accuracy the effective trend of the humidity HU in the cooking chamber 3; at the same time, the trend of the temperatures T1 measured by the first probe 90 also follows quite correctly the trend of humidity, even if slowly. Thus, the system, after having assessed the agreement between the temperature trends T1, T2 detected by the two probes, proceeds to estimate the humidity value $U_{ESTIMATED}$, basing itself on the temperature T2.

In the interval of time between t1 and t2, the humidity in the cooking chamber 3 continues to drop until it reaches very low values. For what explained above, the trend of the temperatures T2 measured by the second probe 91 does not follow with sufficient accuracy the trend of humidity; on the other hand, the trend indicated by the temperatures T1 detected by the first probe 90 is more relevant. Thus the system, having detected a disagreement between the trends of temperatures T1, T2, proceeds by estimating the $U_{ESTIMATED}$ humidity value by relying on the temperature T1. In the graph, for the times subsequent to t2, the agreement between the trends of the temperatures T1 and T2 is re-established, and thus the control unit 99 returns again to estimating the humidity in the cooking chamber 3 in response to T2.

The control unit 99 is operatively connected to both the steam generator and the steam vent inside the cooking chamber 3, and also to the control interface 10 through which the operator sets the temperature parameters and in particular the desired humidity USET inside the oven for the selected cooking cycle, making any necessary corrections during the different cooking phases, in particular making any adjustments also on the basis of the quantity of water released by the food. Alternatively, the operator can select a cooking cycle from a recipe book previously memorized either by the same operator or by the oven manufacturer.

The control unit 99 proceeds then by comparing the humidity value of the cooking chamber estimated through the detection system 100 and the humidity value set by the operator USET, for example through the control interface 10, operating the most adequate steam generator or the relief valve accordingly in order to obtain the adjustment most appropriate for the purpose.

It should be noted that the setting of the humidity inside the oven by the operator is usually visual and the percentage value indicated by it does not correspond to the thermodynamic value. In other words, the humidity detection reference system used by the instruments, that thus takes into account the pressure and temperature, and the visual one used by the operator, are different: the system is made in such a way as to correctly translate the commands given by the operator.

From the above it is therefore evident how an oven according to the present invention achieves the initially foreseen objectives and advantages. In fact, a convection and steam cooking oven is provided equipped with a humidity detection system sufficiently accurate and rapid and at the same time economically convenient to be used inside an oven, as it is made with products that are easily available on the market and at limited costs.

Further, a detection and adjustment system is provided that is capable of operating even at temperatures higher than 180° C., and up to 300° C., thus being suitable for use in an oven.

Advantageously, the oven equipped with a humidity detection and adjusting system according to the present invention is easy to produce with the usual known plants, machinery and equipment.

Moreover, the above-disclosed process for detecting and adjusting the humidity in the cooking chamber takes place completely automatically and makes it possible to obtain with sufficient accuracy the desired/preset humidity in the cooking chamber.

Naturally, the present invention is susceptible to numerous applications, modifications or variations without thereby departing from the scope of protection, as defined by the accompanying claims.

Further, the materials and equipment used to achieve the present invention, as well as the forms and dimensions of the individual components, may be the most suitable for the specific requirements.

We claim:

1. A convection and steam oven comprising an outer supporting casing containing a cooking chamber to contain food, a heating element for heating atmosphere in said cooking chamber, steam generating element for producing steam, a relief valve for releasing steam from the cooking chamber, and a cooking chamber humidity detection and regulation system which comprises:

a first conduit for sampling the atmosphere of the cooking chamber, a second conduit for releasing the sampled atmosphere into the cooking chamber, a humidity detection element interposed between the first and the second conduit and connected to them, the detection element being formed by a hollow body having portions of different cross-section, said humidity detection element comprising a central body connected to the first conduit and the second conduit by a first tubular element and a second tubular element, said central body having a section larger than the first tubular element and the second tubular element;

temperature sensor comprising first and second temperature probes positioned on an exterior surface of the humidity detection element, said first temperature probe being disposed on an outer and lower surface of said central body and said second temperature probe being disposed on an outer and upper surface of one of said tubular elements; and a control unit adapted to operate said steam generating element and said relief valve in response to the temperature values detected by said first and second temperature probes.

* * * * *